United States Patent
Masood

(10) Patent No.: US 7,498,754 B2
(45) Date of Patent: Mar. 3, 2009

(54) ARCHITECTURE FOR DRIVING MULTIPLE LOADS AT CONSTANT CURRENT

(75) Inventor: Ahmed Masood, Saratoga, CA (US)

(73) Assignee: Supertex, Inc., Sunnyvale, CA (US)

( * ) Notice: Subject to any disclaimer, the term of this patent is extended or adjusted under 35 U.S.C. 154(b) by 95 days.

(21) Appl. No.: 11/695,408

(22) Filed: Apr. 2, 2007

(65) Prior Publication Data

US 2008/0238337 A1    Oct. 2, 2008

(51) Int. Cl.
*G05F 1/00*  (2006.01)

(52) U.S. Cl. .................. 315/291; 315/307; 315/312; 315/324; 315/209 R; 345/82; 345/102; 345/212; 345/204

(58) Field of Classification Search .......... 315/247, 315/246, 224, 225, 209 R, 291, 307, 312–326, 315/DIG. 4, 185 S, 200 A; 345/82–99, 102, 345/211–214, 204
See application file for complete search history.

(56) References Cited

U.S. PATENT DOCUMENTS

2008/0180414 A1 *  7/2008  Fung et al. .................. 345/204

* cited by examiner

*Primary Examiner*—Tuyet Vo
(74) *Attorney, Agent, or Firm*—Jeffrey D. Moy; Neiss & May, P.C.

(57) ABSTRACT

A circuit for driving an array of Light Emitting Diode (LED) strings at a constant current has a plurality of LEDs. A plurality of LED drivers is provided wherein a single LED driver is coupled to each of the plurality of LEDs. A voltage reference generator is used for sending a voltage reference signal to each LED driver. The voltage reference generator is external to each of the plurality of LED drivers. An input line voltage is coupled to the voltage reference generator. A clock generator is provided for sending to a clock signal to each of the plurality of LED drivers. The clock generator is external to each of the plurality of LED drivers. A low-frequency PWM dimming input signal is coupled to each of the plurality of LED drivers to allows dimming of the LEDs.

13 Claims, 3 Drawing Sheets

ARCHITECTURE FOR DRIVING MULTIPLE LOADS AT CONSTANT CURRENT

FIELD OF THE INVENTION

The present invention relates generally to Light Emitting Diodes (LEDs), and more specifically, to a circuit for driving an array of LED strings at a constant current.

BACKGROUND OF THE INVENTION

Light Emitting Diode (LED) strings are used in a variety of applications. For example, LED strings may be used for applications including, but not limited to, RGB backlighting for flat-panel displays, signage, decorative lighting, and automotive markets.

Referring to FIG. 1, the current architecture for driving arrays of LED strings is shown. The goal of an LED driver is to process the input line voltage, $V_{IN}$, into the proper DC current for driving the LEDs. The heart of an LED driver is a pulse-width modulation (PWM) controller that regulates and controls the current flowing through the LEDs during operation. A key requirement of the PWM circuit is to drive the LEDs at a constant current to provide uniform and consistent illumination.

As part of the conventional method for driving arrays of LEDs, the PWM controller embodies several circuit blocks, such as a clock generator, voltage reference circuit, and PWM controller circuit with external PWM dimming input (PWM_D). FIG. 2 illustrates a typical PWM peak current-mode control architecture. The current sense input provides a feedback voltage proportional to the current flowing through the load (i.e. LED). A comparator (CM) block determines if this voltage is higher or lower than reference voltage $V_{REF}$, and switches the gate output appropriately to maintain a constant current flowing through the load. An external low-frequency PWM dimming (PWM_D) input allows dimming of the LED light output by taking control of the gate output. It should be noted that such a controller is not specific to any one type of power supply topology.

The problem with the current architecture is that it requires redundant circuitry to control the LED strings. The redundant circuitry causes an increase in die size and cost. Furthermore, in current architecture, the LEDs are not synchronized to a common clock, resulting in non-uniform illumination, beat frequencies, and EMI effects.

Therefore, it would be desirable to provide a system and method to overcome the above problems.

SUMMARY OF THE INVENTION

In accordance with one embodiment of the present invention, a circuit for driving an array of Light Emitting Diode (LED) strings at a constant current is disclosed. The circuit has a plurality of LEDs. A plurality of LED drivers is provided wherein a single LED driver is coupled to each of the plurality of LEDs. A voltage reference generator is used for sending a voltage reference signal to each LED driver. The voltage reference generator is external to each of the plurality of LED drivers. An input line voltage is coupled to the voltage reference generator. A clock generator is provided for sending to a clock signal to each of the plurality of LED drivers. The clock generator is external to each of the plurality of LED drivers. A low-frequency PWM dimming input signal is coupled to each of the plurality of LED drivers to allows dimming of the LEDs.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DESCRIPTION OF PREFFERED EMBODIMENT

Figure 1:
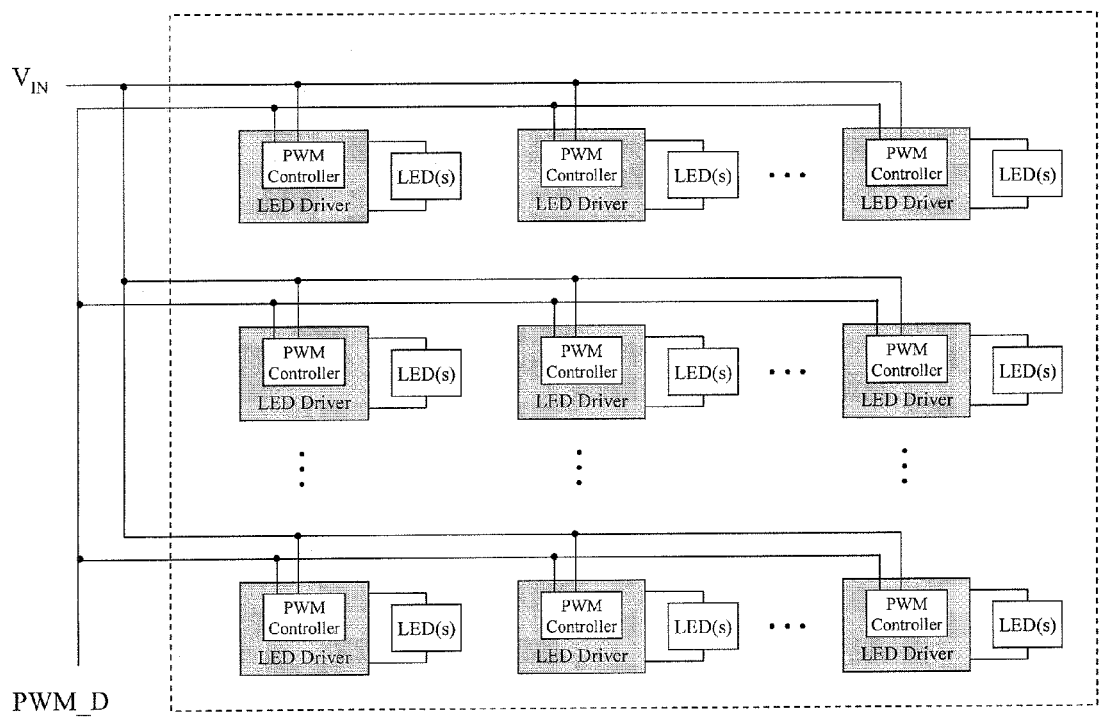
FIG. 1 show the conventional architecture for driving arrays of LEDs, where $V_{IN}$ is the input line voltage, and PWM_D is an external pulse-width modulation dimming input.

Driven by recent advances in performance, LEDs are being rapidly adopted into mainstream applications. For markets requiring arrays of LEDs, LED drivers are configured in array or matrix fashion. Referring to FIG. 1, the current architecture 10 for driving arrays of LED strings is shown. The current architecture 10 comprises a plurality of LEDs 12. The LEDs 12 are arranged in an array or matrix fashion. Each LED 12 is coupled to an LED driver 14. The LED driver 14 is used to control the operation of a respective LED 12. An input line voltage $V_{IN}$ is coupled to each LED driver 14. An external low-frequency PWM dimming (PWM_D) input is also coupled to each LED driver 14. The PWM_D input allows dimming of the LED 12 by taking control of the gate output. It should be noted that such a controller is not specific to any one type of power supply topology.

The heart of each LED driver 14 is a pulse-width modulation (PWM) controller 16. The PWM controller 16 regulates and controls the current flowing through the LEDs during operation. A key requirement of the PWM controller 16 is to drive the LEDs at a constant current to provide uniform and consistent illumination.

Figure 2:
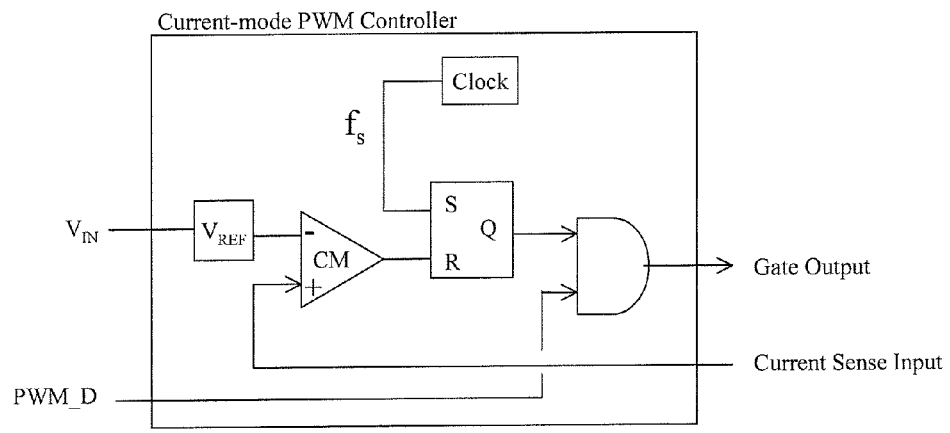
FIG. 2 is a simplified functional block diagram of a conventional current-mode PWM controller.

As part of the conventional method for driving arrays of LEDs 12, the PWM controller 16 comprises several circuit blocks, such as a clock generator 18, voltage reference circuit 20, and PWM controller circuit 22 with external PWM dimming input (PWM_D). FIG. 2 illustrates a typical PWM peak current-mode control architecture. The current sense input provides a feedback voltage proportional to the current flowing through the load (i.e. LED 12). A comparator (CM) block 24 determines if this voltage is higher or lower than reference voltage $V_{REF}$, and switches the gate output appropriately to maintain a constant current flowing through the load. An external low-frequency PWM dimming (PWM_D) input allows dimming of the LED 12 output by taking control of the gate output. It should be noted that such a controller is not specific to any one type of power supply topology.

As stated above, the problem with the current architecture 10 is that it requires redundant circuitry to control the LED 12. The redundant circuitry causes an increase in die size and cost. Furthermore, in the current architecture 10, the LEDs 12 are not synchronized to a common clock, resulting in non-uniform illumination, beat frequencies, and EMI effects.

Figure 3:
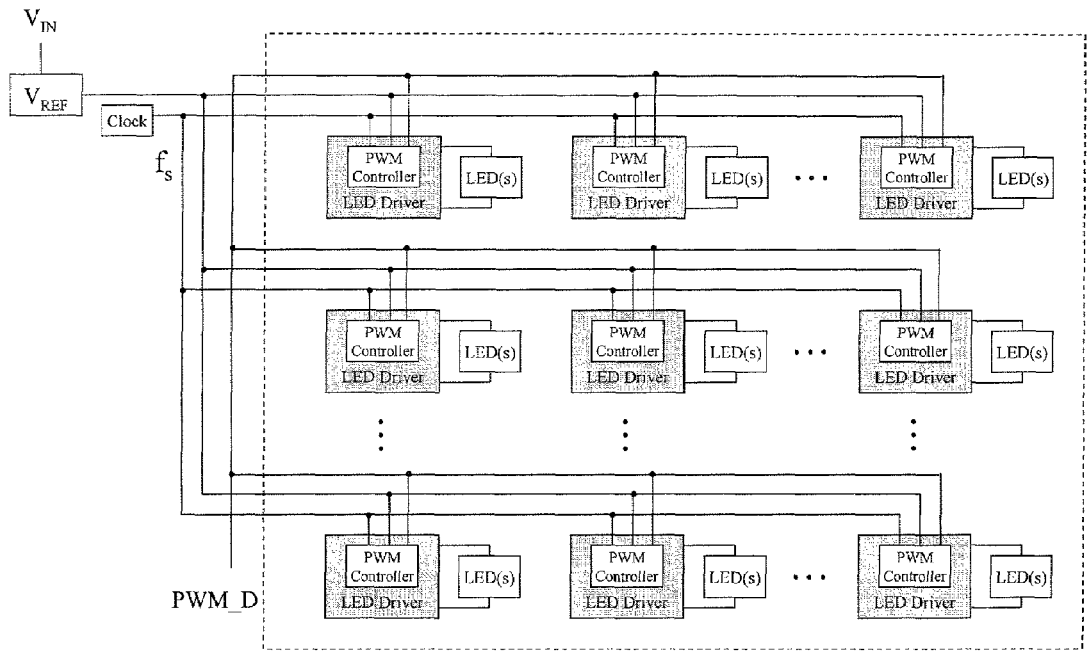
FIG. 3 is a simplified functional block diagram of the present invention showing architecture for driving arrays of LEDs.
Figure 4:
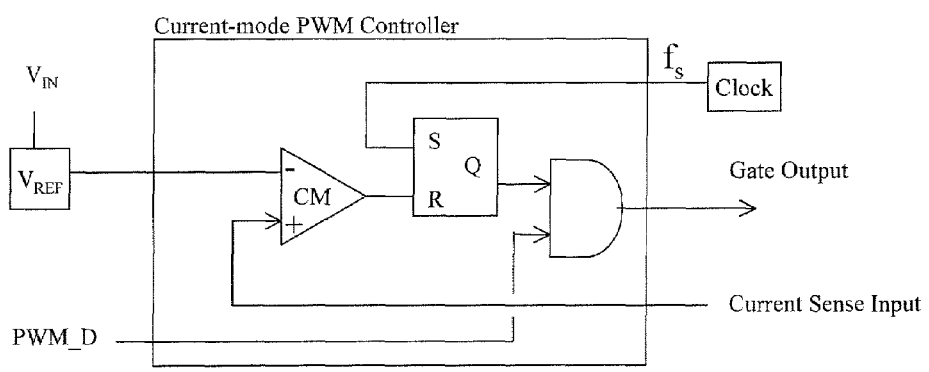
FIG. 4 is simplified functional block diagram of the new architecture for a current-mode PWM controller.

Referring to FIGS. 3 and 4, a new architecture 40 for driving arrays of LED strings is shown. The architecture 40 off loads previously localized clock generator 18 and the voltage reference block $V_{REF}$ and uses a shared bus configuration to provide a common cloak and voltage signal. While FIG. 3 shows a matrix of LED drivers, suitable for an LCD display, for example, this invention applies equally to other configurations as well as other types of loads/devices.

As shown in FIGS. 3 and 4, the architecture 40 comprises a plurality of LEDs 12. The LEDs 12 are arranged in an array or matrix fashion. Each LED 12 is coupled to an LED driver 14A. The LED driver 14A is used to control the operation of a respective LED 12. An input line voltage $V_{IN}$ is coupled to each LED driver 14A. In the embodiment depicted in FIG. 3, the input line voltage $V_{IN}$ is also used as for the voltage reference $V_{REF}$ block 42. A shared bus configuration allows the same voltage reference $V_{REF}$ block 42 to supply the same voltage reference $V_{REF}$ signal to each LED driver 14A. In a like manner, a shared bus configuration allows a single clock generator 42 to supply a common clock signal $f_S$ to each LED driver 14A. A low-frequency PWM dimming (PWM_D) input is also coupled to each LED driver 14A. The PWM_D input allows dimming of the LED 12 by taking control of the gate output. It should be noted that such a controller is not specific to any one type of power supply topology.

Referring now to FIG. 4, the shared bus configuration of FIG. 3 allows previously localized oscillator and voltage reference blocks (as shown in FIG. 2) to be off-loaded from the LED driver 14A. The LED driver 14A has a pulse-width modulation (PWM) controller 16A. The PWM controller 16A regulates and controls the current flowing through the LEDs during operation. The PWM controller 16A has a comparator block 24A. The comparator block 24A determines if this voltage is higher or lower than reference voltage $V_{REF}$, and switches the gate output appropriately to maintain a constant current flowing through the load. The comparator block 24A has a current sense input and an input coupled to the voltage reference $V_{REF}$ block 42. The current sense input provides a feedback voltage proportional to the current flowing through the load (i.e. LED 12). The comparator block 24A determines if this voltage is higher or lower than reference voltage $V_{REF}$.

The output of the comparator block 24A is coupled to switching logic 44. The switching logic 44 switches the output appropriately to maintain a constant current flowing through the load. In the embodiment depicted in FIG. 4, the switching logic 44 has a latch 46. The latch 46 has an input coupled to the clock signal $f_S$ and an input coupled to the output of the comparator block 24A. The output of the latch 46 is coupled to a logic gate 48. The logic gate 48 has an input coupled to an external low-frequency PWM dimming (PWM_D) input. The low-frequency PWM dimming (PWM_D) input allows dimming of the LED 12 output by taking control of the output of the logic gate 48. The comparator (CM) block 24 determines when the current sense input voltage is higher or lower than reference voltage $V_{REF}$, and sends a signal to the latch 46 that switches the logic gate 48 appropriately to maintain a constant current flowing through the load.

The pulse-width modulation (PWM) controller 16A of the present invention simplifies the prior art PWM controller 16 since it reduces redundant circuitry to control the LED strings. The PWM controller 16A uses a shared bus configuration to eliminate the need for a localized oscillator and voltage reference block in each PWM controller 16. The reduction in redundant circuitry reduces die size and cost. Furthermore, in current architecture, the LEDs are synchronized to a common clock, resulting in uniform illumination, beat frequencies, and EMI effects.

Figure 5:
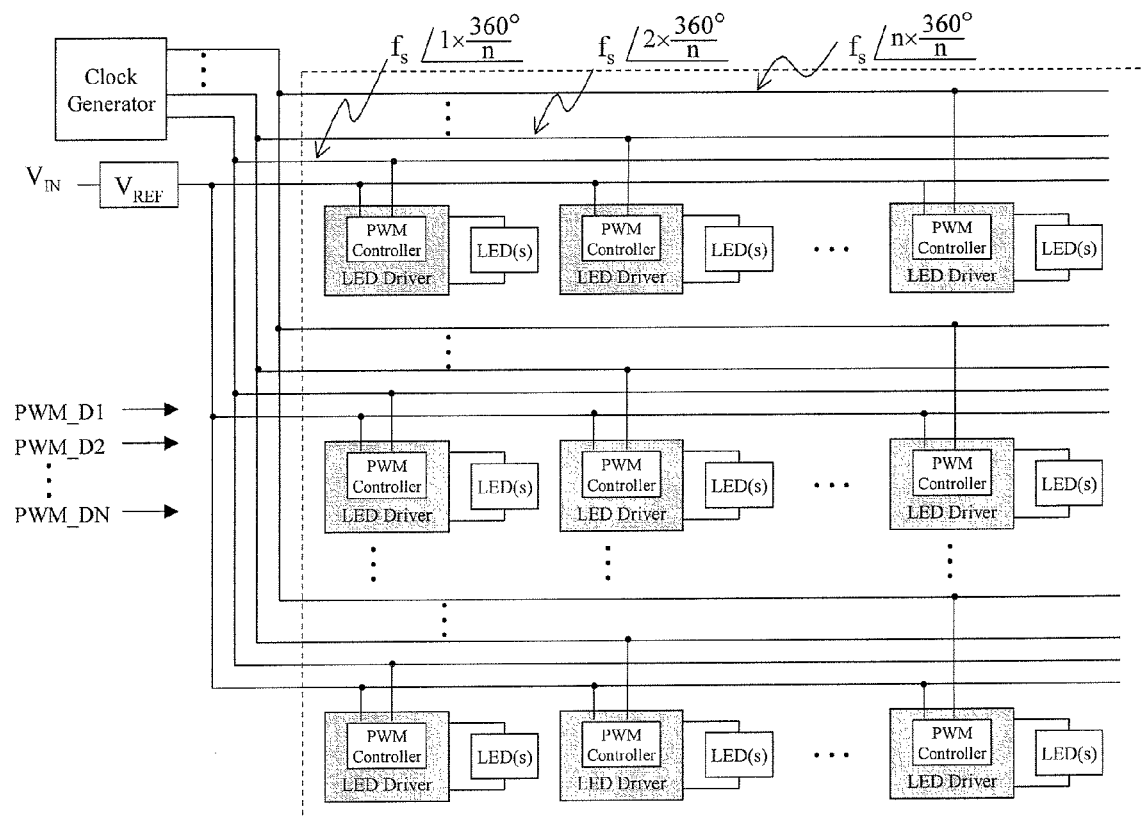
FIG. 5 is a simplified functional block diagram showing architecture for driving multiple clock phases to arrays of LEDs.

Referring now to FIG. 5, the architecture 40 may be extended to account for driving multiple loads with different phases of the original clock frequency. In the embodiment depicted n phases are shown as an example. Different phases of the signal from the clock generator 42 are sent to different rows of the array. The architecture of FIG. 5 has the advantage of reducing the size of input bypass capacitor associated with each LED driver, since dividing the original clock into phases reduces the RMS value of current and increases the fundamental ripple frequency in the total input current.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for driving an array of Light Emitting Diodes (LED) at a constant current comprising:
    a plurality of LEDs;
    a plurality of LED drivers, wherein a single LED driver is coupled to each of the plurality of LEDs, each of the plurality of LED drivers has a Pulse width Modulated (PWM) controller;
    a voltage reference generator for sending a voltage reference signal to each PWM controller, wherein the voltage reference generator is external to each PWM controller;
    an input line voltage coupled to the voltage reference generator;
    a clock generator for sending to a clock signal to each of the PWM controllers, wherein the clock generator is external to each PWM controller; and
    a low-frequency PWM dimming input signal coupled to each PWM controller to allows dimming of the LEDs;
    wherein each of the plurality of PWM controllers comprises:
    a comparator having an input coupled to the voltage reference generator and an input coupled to a current sense input; and
    a switching device having an input coupled to the clock generator, an input coupled to an output of the comparator, an input coupled to the low-frequency PWM dimming input signal, and output of the switching device coupled to an individual LED.

2. A circuit for driving an array of Light Emitting Diode (LEDs) in accordance with claim 1 wherein the witching device comprises:
    a latching device having an input coupled to the clock generator, and an input coupled to an output of the comparator; and
    a logic gate having an input coupled to an output of the latching device, and input coupled to the low-frequency PWM dimming input signal, and an output coupled to the individual LED.

3. A circuit for driving an array of Light Emitting Diode (LEDs)in accordance with claim 1 wherein the clock generator produces different phases of the clock signal, the different phases of the clock signal being coupled to different rows of the array of LED strings.

4. A circuit for driving an array of Light Emitting Diode (LEDs) in accordance with claim 1 wherein the plurality of LEDs are arranged in an array.

5. A circuit for driving an array of Light Emitting Diode (LEDs) in accordance with claim 1 wherein the plurality of LEDs are an array of LED strings.

6. A circuit for driving a lighting array at a constant current comprising:
a plurality of LEDs arranged in an array;
a plurality of LED drivers, wherein a single LED driver is coupled to each of the plurality of LEDs, each of the plurality of LED drivers having a Pulse Width Modulated (PWM) controller, the PWM controller comprising:
a comparator having an input coupled to the voltage reference generator and an input coupled to a current sense input; and
a switching device having an input coupled to the clock generator, an input coupled to an output of the comparator, an input coupled to the low-frequency PWM dimming input signal, and output of the switching device coupled to an individual LED;
a voltage reference generator for sending a voltage reference signal to each PWM controller, wherein the voltage reference generator is external of the PWM controller;
an input line voltage coupled to the voltage reference generator;
a clock generator for sending to a clock signal to each PWM controller, wherein the clock generator is external of the PWM controller; and
a low-frequency PWM dimming input signal coupled to each PWM controller to allows dimming of the LEDs.

7. A circuit for driving a lighting array at a constant current in accordance with claim 6 wherein the switching device comprises:
a latching device having an input coupled to the clock generator, and an input coupled to an output of the comparator; and
a logic gate having an input coupled to an output of the latching device, and input coupled to the low-frequency PWM dimming input signal, and an output coupled to the individual LED.

8. A circuit for driving a lighting array at a constant current in accordance with claim 6 wherein the clock generator produces different phases of the clock signal, the different phases of the clock signal being coupled to different rows of the array of LED strings.

9. A circuit for driving a Light Emitting Diode (LED) at a constant current comprising:
a plurality of LEDs arranged in a matrix fashion;
a plurality of LED drivers, wherein a single LED driver is coupled to each of the plurality of LEDs;
a voltage reference generator for sending a voltage reference signal to each LED driver, wherein the voltage reference generator is external to each of the plurality of LED drivers;
an input line voltage coupled to the voltage reference generator;
a clock generator for sending to a clock signal to each of the plurality of LED drivers, wherein the clock generator is external to each of the plurality of LED drivers; and
a low-frequency PWM dimming input signal coupled to each of the plurality of LED drivers to allows dimming of the LEDs;
wherein each of the plurality of LED drivers has a Pulse Width Modulated (PWM) controller comprising:
a comparator having an input coupled to the voltage reference generator and an input coupled to a current sense input; and
a switching device having an input coupled to the clock generator, an input coupled to an output of the comparator, an input coupled to the low-frequency PWM dimming input signal, and output of the switching device coupled to an individual LED.

10. A circuit for driving a Light Emitting Diode (LED) in accordance with claim 9 wherein the switching device comprises:
a latching device having an input coupled to the clock generator, and an input coupled to an output of the comparator; and
a logic gate having an input coupled to an output of the latching device, and input coupled to the low-frequency PWM dimming input signal, and an output coupled to the individual LED.

11. A circuit for driving a Light Emitting Diode (LED) in accordance with claim 9 wherein the clock generator produces different phases of the clock signal, the different phases of the clock signal being coupled to different rows of the array of LED strings.

12. A circuit for driving a Light Emitting Diode (LED) in accordance with claim 9 wherein the plurality of LEDs are arranged in an array.

13. A circuit for driving a Light Emitting Diode (LED) in accordance with claim 9 wherein the plurality of LEDs is a plurality of LED strings.

* * * * *